United States Patent

Merrill, Jr.

[11] Patent Number: 5,087,063
[45] Date of Patent: Feb. 11, 1992

[54] RETRACTABLE TRAILER TONGUE SUPPORT JACK

[76] Inventor: Kenneth T. Merrill, Jr., 1002 Myers Rd., Celina, Ohio 45822

[21] Appl. No.: 493,242

[22] Filed: Mar. 14, 1990

[51] Int. Cl.⁵ .................................. B60S 9/18
[52] U.S. Cl. ..................... 280/475; 280/763.1; 254/420
[58] Field of Search ........... 280/475, 763.1, 764.1; 254/420, 424

[56] References Cited

U.S. PATENT DOCUMENTS

| | | | |
|---|---|---|---|
| 2,196,510 | 4/1940 | Vutz | 254/420 |
| 2,499,882 | 3/1950 | Seaholm | 254/420 |
| 2,672,318 | 3/1954 | Lee | 280/420 |
| 2,784,985 | 3/1957 | Schnell | 254/420 |
| 3,863,894 | 2/1975 | Mansi et al. | 254/86 R |
| 4,253,680 | 3/1981 | Albright et al. | 280/431 X |

*Primary Examiner*—Charles A. Marmor
*Assistant Examiner*—Victor E. Johnson

[57] ABSTRACT

A combination, retractable jack and support apparatus for trailer tongues. The jack is pivotally connected to counterbalance which is used to raise or lower the support apparatus. The design provides a sturdy horizontal support for trailers in port, disconnected from towing vehicles; and a means to facilitate mechanical retraction of the support apparatus when coupling to a towing vehicle for road travel.

4 Claims, 2 Drawing Sheets

RETRACTABLE TRAILER TONGUE SUPPORT JACK

BACKGROUND OF THE INVENTION

The present disclosure relates to apparatus for coupling trailers, and more particularly, but not by way of limitation, to a retractable, combination support member and jack for trailer tongues. The present invention is an improved means for stable support of a trailer independently detached from a towing vehicle, and an improved means for retraction of the support means when the trailer is coupled for travel mode.

For safety and operational reasons, the main axle on a conventional trailer is located behind the trailer's center of gravity. This common design causes the weight of the trailer to bear primarily on the tongue of the trailer's coupling. Therefore, with most conventional trailers, a jack is necessary to raise the tongue when coupling with a towing vehicle. This makes a jack mounted onto the tongue highly desirable. It is also desirable for trailer frames to remain horizontal when detached from towing vehicles. Consequently, most jacks on trailer tongues are designed to function as both a jack and a support member. For further convenience, the combined jacking and supporting apparatus is retractable when the trailer is towed by a powered vehicle.

In the past, several attempts were made to incorporate all of the above desired features. U.S. Pat. Nos. 3,863,894, 2,784,985, and 2,153,722 all disclose mounted jacks which can serve as supporting means when the trailer is uncoupled and capable of retraction when the trailer is being towed. All three references disclose devices which have a single, vertically oriented supporting member. This single support member is vulnerable to various design stresses. Such stresses include extraneous vibrations over the surface supporting the trailer such as from movement by passing vehicles, and lateral forces acting on the trailer frame such as those created when heavy objects are loaded into a freight trailer or from movement within a recreational trailer. If such stress is of sufficient magnitude or is cumulatively exerted over time, the connection between the supporting member and the tongue will undergo structural failure.

Some prior art recognize the structural instability of single support members. For example, U.S. Pat. No. 2,672,318 discloses a single support member pivotally connected at one end to a trailer tongue and pivotally connected at the opposite end to a jack. This design provides some stability for forward and backward "rocking" stresses because the supporting member exerts a torque at its point of attachment to the trailer tongue. However, the design is still vulnerable to lateral stresses.

Another design consideration inadequately addressed by prior art is the weight-to-strength ratio of support members in relation to retractability. For increased stability, support members have to have more structural components, which logically increases weight. Additionally, heavier structural materials can be substituted for existing components of support means to provide greater stability. However, enhancing stability increases the overall weight of the support means, which compromises the ease of retractability. There is a need, therefore, for supplemental mechanical means to assist in the retraction of heavy support members to decrease the amount of lifting force required.

The problems abundant in the prior art are overcome with the present invention. The following specification discloses a retractable, combination jack and support apparatus comprising a jack both pivotally connected to a support frame and pivotally connected to a trailer tongue. The support frame is designed to withstand lateral, forward and backward stresses, and is of a heavy, sturdy construction. The jack with its two pivotal connections combined with a counterbalance form a pivot arm and an integral counterweight which creates a mechanical and physical advantage to the retraction and lowering of the support frame.

SUMMARY OF THE INVENTION

The support frame of the present invention is of sturdy construction capable of withstanding a large variety of stresses that come to bear on independent horizontal support means of conventional trailer tongues. In the preferred embodiment, one end each of two elongate support members are pivotally connected to a trailer while the remaining ends of the support members converge at an apex to form a triangular support frame. The support members are pivotally connected to a jack via a support beam. The jack maintains a nearly vertical position when the trailer tongue is supported in a horizontal position with the support members providing the bulk of stability.

A caster or wheel is attached to the ends of the support members where they meet to form the apex of the triangular frame. One embodiment uses a landing shoe instead of the caster, and it is obvious to skilled artisans that any number of other devices could be substituted for either the caster or the shoe and achieve the same ends. Unlike most conventional support frames, the caster or shoe at the apex of the triangular support frame forms the point of contact with the ground instead of the jack. The jack is connected to the trailer tongue rearward from the point of contact with the ground and does not itself make contact with the ground. This provides added stability from stresses created from movements of the tongue relative to the ground contact point.

The support frame is comprised of mechanical steel tubing which, combined with a triangular design configuration, provides the optimum in unhitched trailer support. Those skilled in the art could easily substitute other metals or materials to achieve the same results and these substitutions are encompassed within the spirit of this disclosure. Heavier support frames increase stability but increased weight means added effort for an operator who has to retract the frame when the trailer is hitched onto a towing vehicle. To facilitate retraction of support frames, the present invention utilizes counterbalances rotatably connected to both a jack and the trailer tongue at independent pivot connections. The jack, in turn, is pivotally connected to the support frame, and the jack acts as both a jacking apparatus and a part of the support mechanism. The several pivot connections allow the jack and the support frame to be lowered for jacking and support of the trailer tongue and retracted for mobile coupling.

During rotational movement, kinetic energy is induced into the counterbalances which causes a classical "flywheel effect" with the pivotal connections to the trailer tongue being the axis and the pivotal connections with the jack forming the periphery of the effect. As the counterbalances are rotated counterclockwise about the connections with the trailer tongue, the jack and support frame are lowered to the ground. The connections of the jack to the counterbalances are rotated slightly past the lowest point of rotation about the points of connection to the trailer tongue as the support frame is lowered. Clefts in the trailer tongue engage the pivotal connections between the jack and the counterbalances which prevent the counterbalances from rotating beyond those engagements. A releasable, spring-biased stop mechanism prevents the counterbalances from rotating back out of the above engagements, and the support frame cannot be raised back until the stop mechanism is released.

The weight of the trailer tongue maintains the position of the counterbalances against the clefts located on the trailer tongue when the support frame rests on the ground. This effectively locks the support frame in the lowered position. To raise the support frame and jack from the lowered position to the retracted position, the ends of the counterbalances connected to the jack is rotated in a clockwise direction past the highest point of rotation until the counterbalances are halted by contact with a crossbeam mounted on the trailer tongue. The spring-biased stop now prevents the counterbalances from rotating back out of position until the stop is released.

The counterbalances of the present invention provide a unique means for lifting the jack and triangular support frame to the raised position using mechanical leverage and stored gravitational potential energy. With the retraction of the spring-biased stop, the weight of the support frame and jack is released causing the counterbalances on which the jack is pivotally mounted to rotate about the pivotal connections of the counterbalances with the trailer tongue. The momentum of the descending support frame and jack is conserved as the counterbalances fall to the lowest point of rotation around the point of connection to the trailer tongue, and that momentum causes the counterbalances to continue rotating upwardly.

Counterweights equaling the weight of the support frame and jack are mounted onto the counterbalances. Since the weight of the support frame and the jack is supported by the pivotal connections between the trailer tongue and the counterbalances and since the counterweights are sized to equal the weight of the support frame and jack, the pivotal connections serve as levers such that only a small amount of manual force is needed to induce sufficient kinetic energy into the counterbalances to raise the jack and support frame.

After the counterbalances reach the highest point of rotation, they rotate slightly further forward finally placing the support frame in its raised position. The counterbalances are prevented from further rotation as already described above. The jack is then retracted, drawing the support frame upward until the support frame comes into contact with the trailer tongue. The counterbalances are effectively locked into position by the weight of the jack and support frame.

There is a wide possibility of different configurations, arrangements and design changes which one skilled in the art could adapt to the present apparatus and accomplish the same objectives. All these possibilities are included within the spirit of the present invention. Other objects, features and advantages of this invention will become evident in light of the following description of the invention.

DETAILED DESCRIPTION OF THE PREFERRED EMBODIMENT

Figure 1:
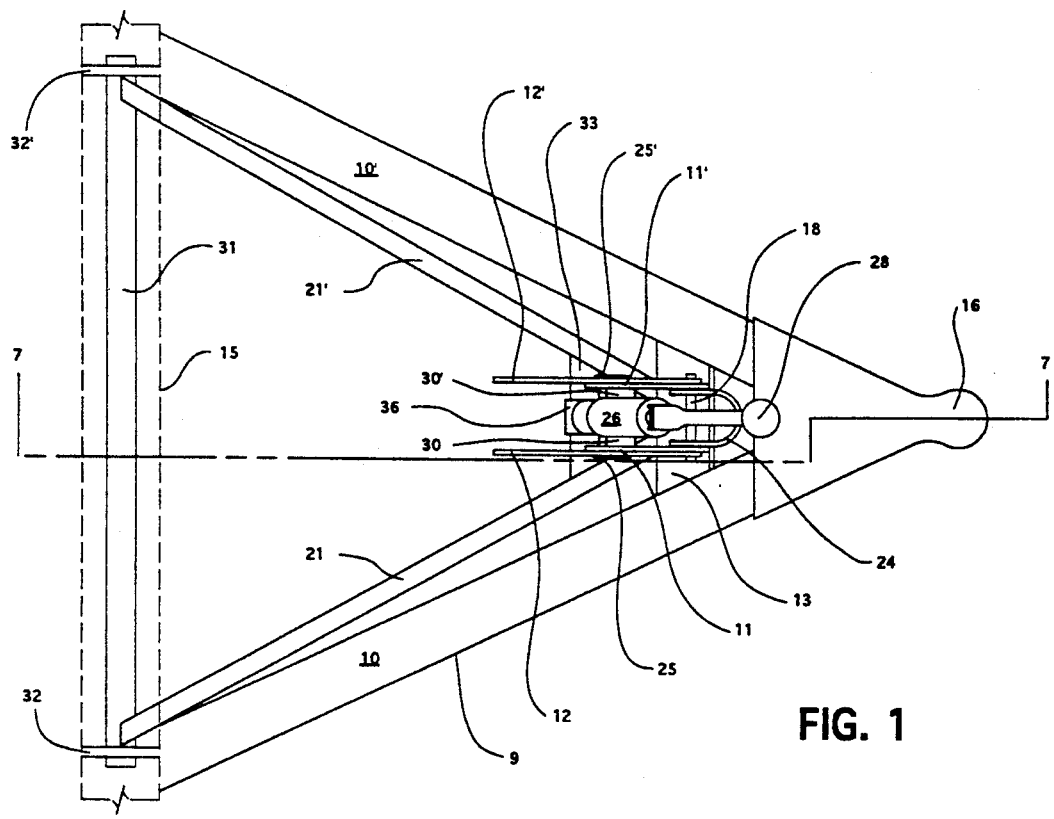
FIG. 1 is a top plan view of the preferred embodiment.

Referring to FIG. 1, the trailer tongue is generally designated with numeral 9. Trailer tongue 9 is comprised of two elongate members 10 and 10' which meet at socket housing 16. Socket housing 16 contains socket 17 (shown in FIG. 2) for receiving the ball of a common trailer hitch. Elongate members 10 and 10' are both permanently attached to trailer frame 15 (shown in phantom lines) forming a triangle with trailer frame 15 being the base and elongate members 10 and 10' forming the legs. Trailer tongue 9 is reinforced with crossbeam 13 which connects elongate members 10 and 10'. Mounting plates 11 and 11' are also connected to crossbeam 13.

The support frame is generally designated with numeral 20. Support frame 20 is comprised of two support members 21 and 21' which meet at caster 34 (shown in FIG. 2). Support members 21 and 21' are connected to crossbar 31 forming a second triangle with support members 21 and 21' making up its legs and crossbar 31 forming the base. Two tabs 32 and 32' connect crossbar 31 to trailer frame 15. Support frame 20 is reinforced with support beam 33 which connects support members 21 and 21'.

Figure 2:
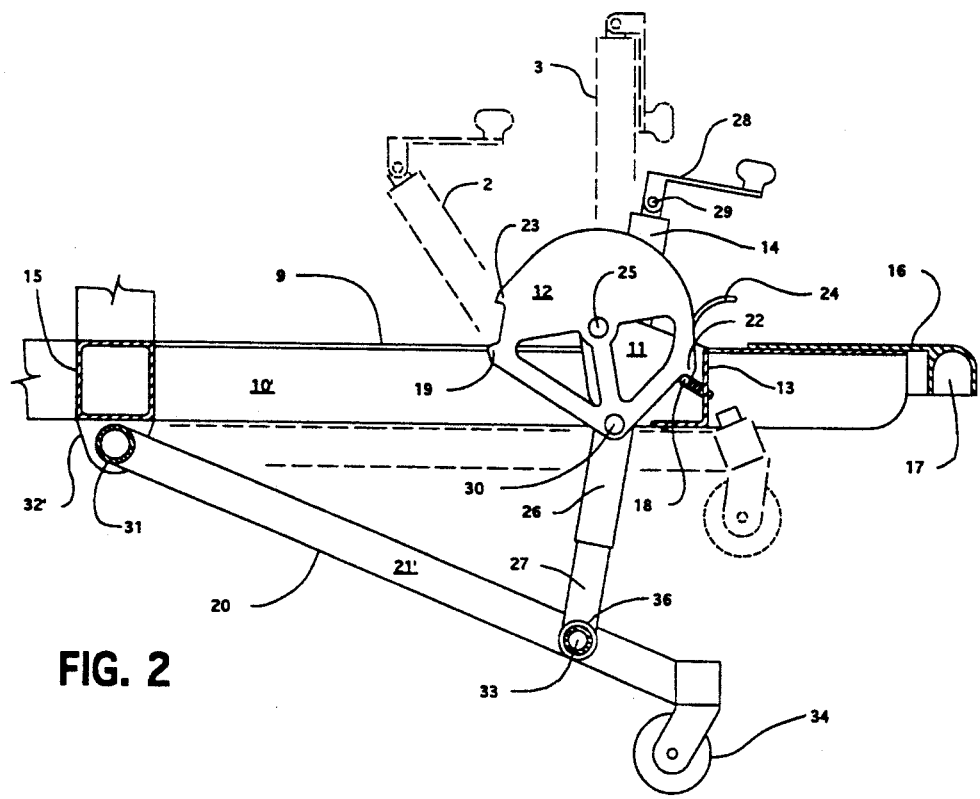
FIG. 2 is a cross-sectional view of the apparatus of FIG. 1 taken along the lines 7—7 in FIG. 1.

Referring to FIG. 2, support beam 33 connects with collar 36 which is the lowermost portion of jack 14. Collar 36 wraps around short beam 33 forming a pivot connection, allowing jack 14 to pivot about support beam 33. Jack 14 is comprised of outer jacket 26 and telescoping member 27. Crank arm 28 rotates with respect to the longitudinal axis of jack 14 and also pivots about pin 29. FIG. 2 shows outer jacket 26 of jack 14 pivotally mounted into counterbalance 12 with trunnion 30. Trunnions 30 and 30' are short cylindrical studs which protrude out of each lateral side of jacket 26 and engage with respective counterbalances 12 and 12'. Counterbalance 12 is pivotally mounted to mounting plate 11 by means of gudgeon 25. Like the trunnions, gudgeon 25 and 25' protrude from plate 11 and 11', respectively, and engage respective counterbalances 12 and 12'.

FIG. 1 shows outer jacket 26 with trunnions 30 and 30' extending out on its lateral sides. Mounting plates 11 and 11' are shown at an elevation above trunnions 30 and 30'. Mounting plates 11 and 11' are connected to counterbalances 12 and 12' at gudgeons 25 and 25', respectively. Referring back to FIG. 2, jack 14 pivots about counterbalance 12 on trunnion 30, and counterbalance 12, in turn, pivots about mounting plate 11 on gudgeon 25. These two simultaneous pivoting actions allow support frame 20 to alternate between a lowered, support position and a raised, retracted position (shown with phantom lines).

The preferred embodiment has limiting mechanisms to control the extent of rotation of the two counterbalances and to hold the counterbalances once in place in either the support or retracted position. Mechanical stop 18 is part of a latching mechanism which alternatively fixes or releases the counterbalances as support frame 20 is lowered or raised. FIG. 2 shows the orientation of counterbalance 12 when support frame 20 is in its lowered, support position. Dog 22 of counterbalance 12 is shown latched in place at mechanical stop 18. In the lowered, support position, counterbalance 12 rests on trunnion 30. This is better illustrated in FIG. 3.

Figure 3:
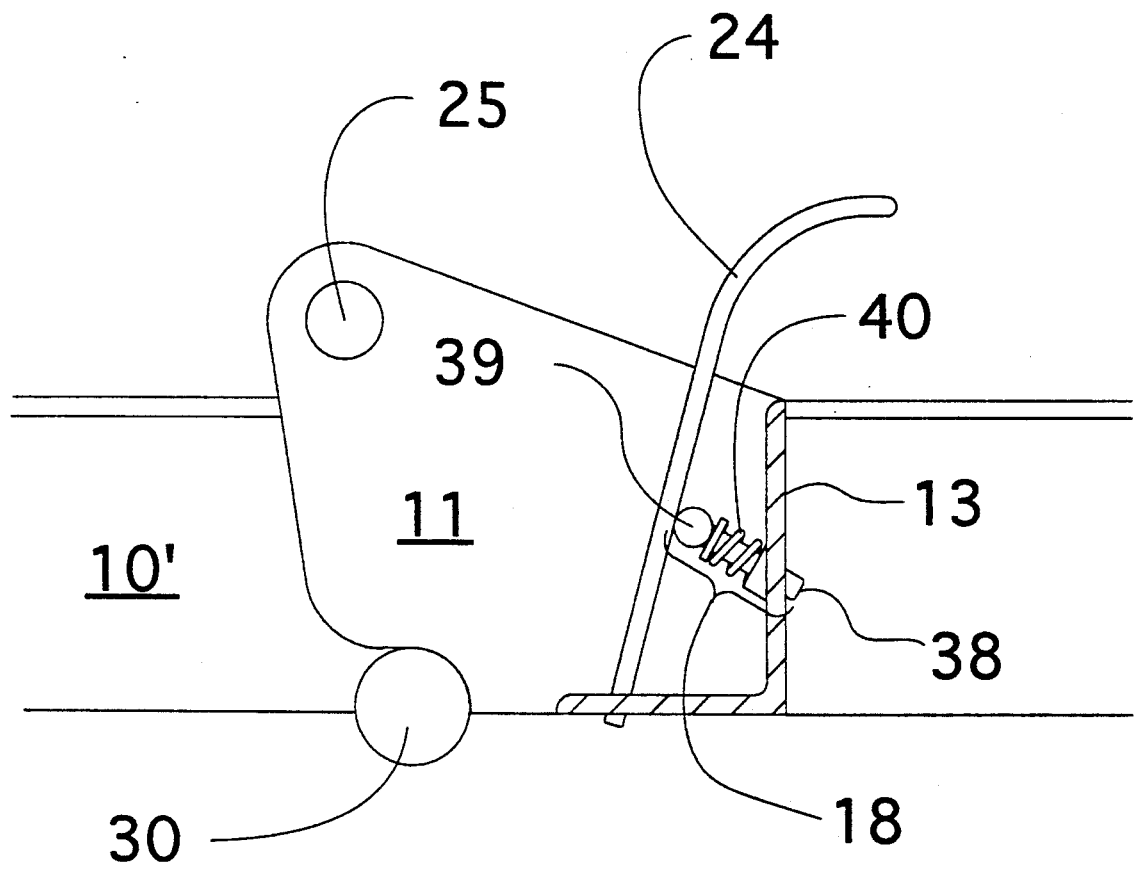
FIG. 3 is a detailed illustration of the counterbalance limiting mechanisms of the preferred embodiment.

FIG. 3 is a detailed illustration of some of the components that comprise the limiting mechanisms of the preferred embodiment. When the support frame is in the lowered position, trunnion 30 rests within cleft 35 of mounting plate 11. Cleft 35 halts counterclockwise rotation of counterbalance 12 as support frame 20 is placed in the lowered, support position. FIG. 3 also illustrates the components of the latching mechanism which is made up of mechanical stop 18 and handle 24. Mechanical stop 18 is comprised of latchbar 39, coil spring 40 and guidebar 38. Coil spring 40 is kept in alignment by guidebar 38. Compression of coil spring 40 between latchbar 39 and crossbeam 13 places a bias against any element engaging latchbar 39.

Dog 22 on counterbalance 12 (shown in FIG. 2) engages latchbar 39. Bias on dog 22 is maintained until manual release of latchbar 39 with handle 24 which is attached to washer 41. Washer 41 is pivotally mounted onto latchbar 39. The lower portion of handle 24 is attached at anchor 37 in crossbeam 13 which provides a fulcrum for handle 24 to act as a lever against washer 41. When handle 24 is depressed, washer 41 compresses against coil spring 40 which disengages latchbar 39 from dog 22 releasing counterbalances 12.

Referring to FIG. 2, support frame 20 is raised to its retracted position by an operator initially cranking jack 14 with crank arm 28 to retract telescoping member 27. This partially retracts support frame 20. Next, the operator takes one hand and depresses latchbar 39 using handle 24 which releases dog 22 on counterbalance 12. While maintaining the hold on handle 24, the operator takes his other hand and grabs the upper portion of jack 14 and pushes it rearward to a position depicted in FIG. 2 by a jack drawn in phantom lines designated with the numeral 2. One embodiment uses a handle (not shown) mounted on jacket 26 of jack 14 to accomplish this rearward push of jack 14, but the preferred embodiment does not require this handle. As jack 14 is pushed rearward, counterbalance 12 rotates in a clockwise direction about one rotational axis at gudgeon 25 and another rotational axis at trunnion 30 raising support frame 20 upward.

Once mechanical stop 18 is cleared by dog 22, counterbalance 12 pivots past the lowest point of rotation about gudgeon 25 which imparts a mechanical advantage to the lifting of support frame 20. Crossbeam 13 halts the clockwise rotation of counterbalance 12 when lip 19 abuts crossbeam 13. Ear 23 on counterbalance 12 now engages mechanical stop 18. Fully retracted, jack 14 comes to rest in the position depicted by phantom image 3.

The lifting force required to raise support frame 20 with the rotational movements of counterbalances 12 and 12' is far less than the force that would be required to overcome the pull of gravity exerted by the actual weight of support frame 20. The reduction in amount of required force is accomplished with much of the weight initially being borne by gudgeons 25 and 25' which is then translated into the static counterbalance and dynamic momentum gained from pivoting counterbalances 12 and 12'.

Although the present invention has been described in terms of the foregoing presently preferred embodiment, it will be understood by those skilled in the art who have the benefit of this disclosure that changes may be made to that preferred embodiment without departing from the spirit of the present invention, the scope of which is measured by the following claims.

What is claimed is:

1. A retractable jacking and support apparatus mounted on a trailer tongue comprising:

a support frame comprised of two elongate members having front and rear ends, each of said elongate members pivotally connected at said rear end to said trailer tongue and rigidly connected to each other at said front end, said pivotal connections widely spaced along a common axis and said front ends forming an apex in a triangular shape;

a first means for lifting and lowering said support frame from a jacking position in which said apex is adjacent to a ground surface to a support position in which said apex is forced downward contacting said ground surface and thereby elevating said trailer tongue, said first means comprised of a jack pivotally connected adjacent said apex of said support frame and vertically interposed between said support frame and said trailer tongue such that said jack extends upward from said pivotal connection with said support frame;

a second means for lifting and lowering said support frame in combination with said jack from a retracted position in which said support frame is closely approximated and parallel to said trailer tongue to said jacking position, said second means comprised of at least one pivoting link having a stationary pivotal connection to said trailer tongue and a dynamic pivotal connection to said jack, said dynamic pivotal connection describes a circular arc having a vertical orientation and traversing at least 180 degrees about said stationary pivotal connection thereby effecting said second means for lifting and lowering of said support frame.

2. The apparatus of claim 1 further comprising a means of attachment between said pivoting link and said trailer tongue supporting said stationary pivotal connection of said pivoting link and limiting the travel of said dynamic pivotal connection about said stationary pivotal connection such that said dynamic pivotal connection assumes a position above said stationary pivotal connection when said support frame is in said retracted position and said dynamic pivotal connection assumes a position below said stationary pivotal connection when said support frame is in said jacking and support positions.

3. The apparatus of claim 2 wherein a spring biased mechanical stop provides means for retaining said pivoting link in combination with said jack when said support frame is in said retracted position and provides means for retaining said pivoting link in combination with said jack when said support frame is in said jacking and support positions.

4. The apparatus of claim 1 wherein said second means is comprised of a counterweight formed as an integral part of said pivoting link such that the effective center of mass of said counterweight shall remain in a position counterpoised opposite to the dynamic pivotal connection relative to the stationary pivotal connection, thereby providing a static counterbalance to the weight of said support frame and said jack and enhancing the use of kinetic energy during said lifting of said support frame and said jack from said jacking position to said retracted position.

* * * * *